March 12, 1963 A. C. GRETLER ETAL 3,081,173
SAUSAGE PREPARATION AND DYEING
Filed Oct. 24, 1960 2 Sheets-Sheet 1
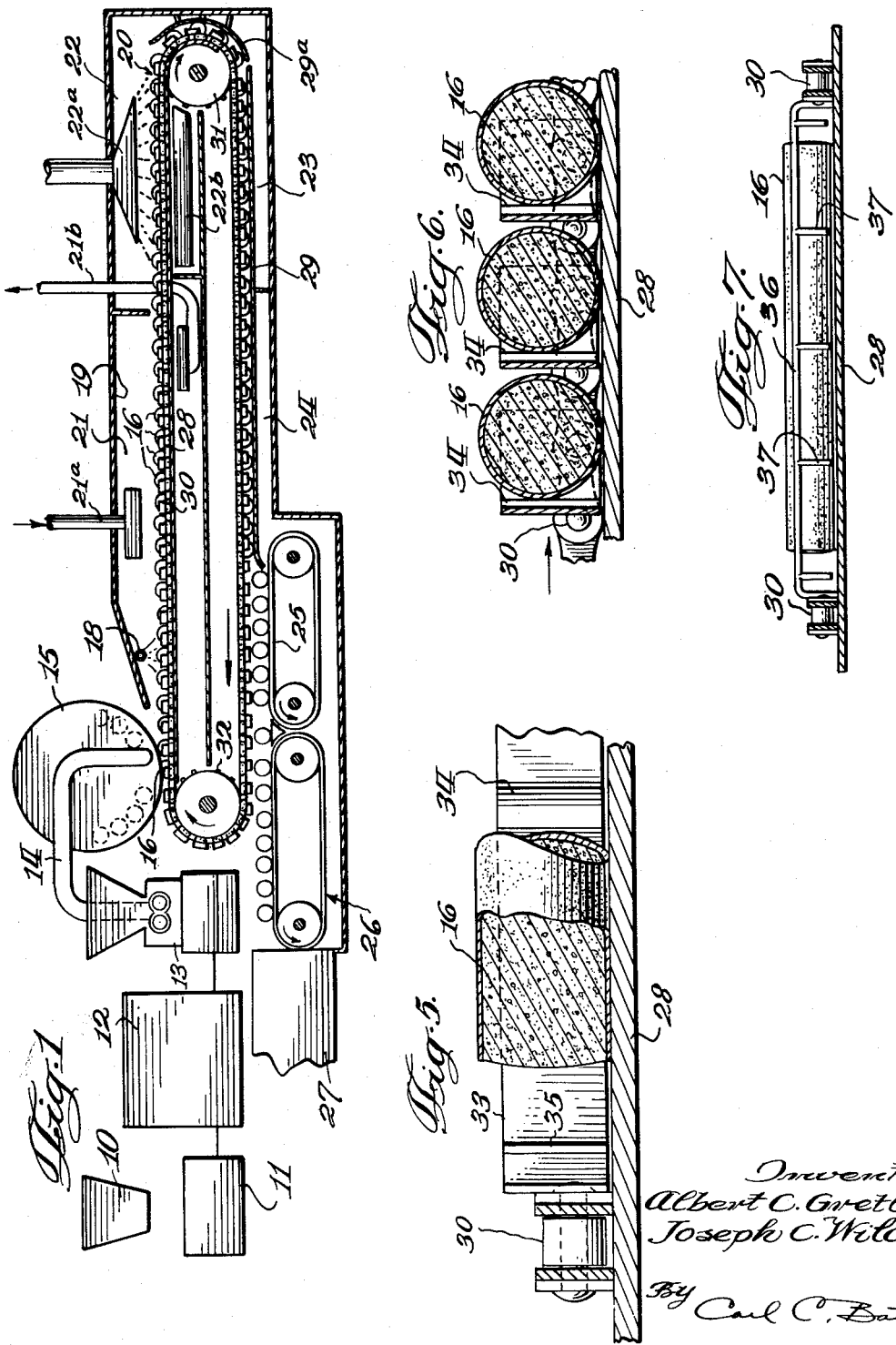
Inventors
Albert C. Gretler
Joseph C. Wilcox
By Carl C. Batz
Attorney

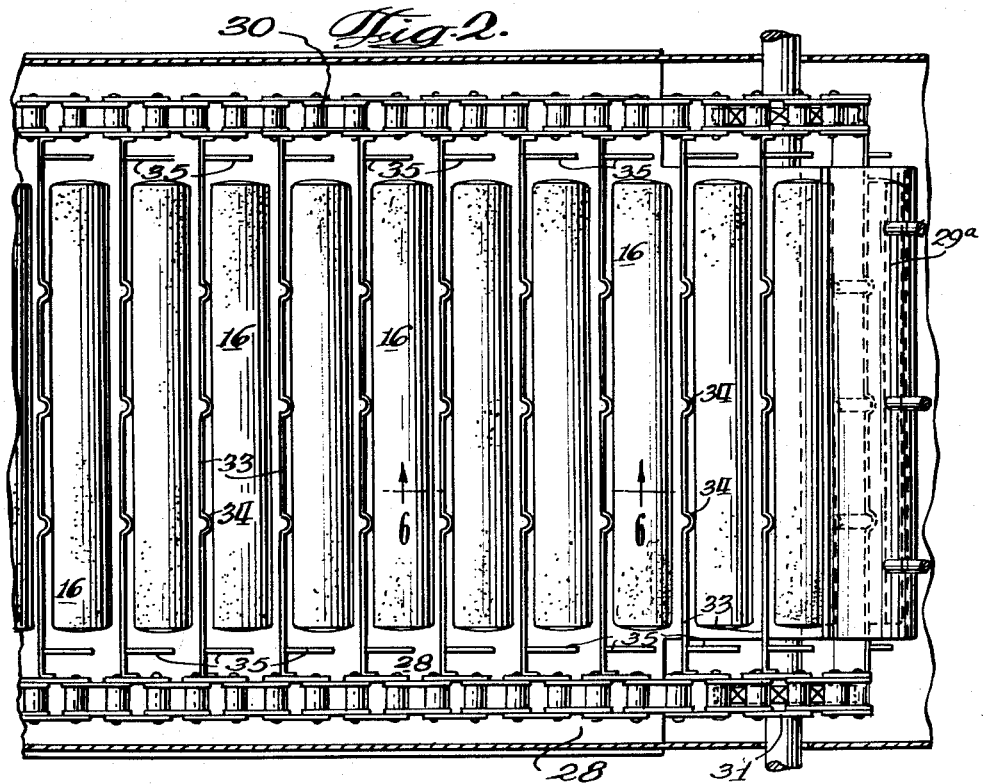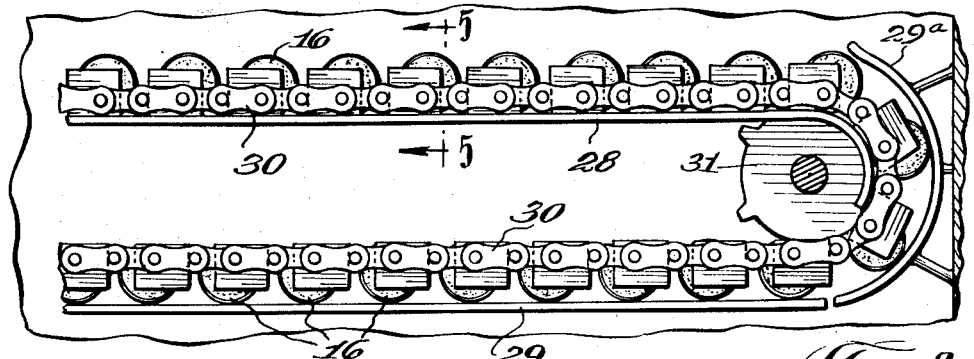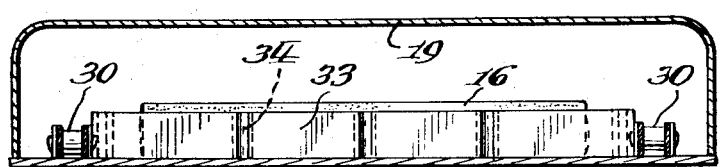

United States Patent Office 3,081,173
Patented Mar. 12, 1963

3,081,173
SAUSAGE PREPARATION AND DYEING
Albert C. Gretler, Downers Grove, and Joseph C. Wilcox, Park Forest, Ill., assignors to Armour and Company, Chicago, Ill., a corporation of Delaware
Filed Oct. 24, 1960, Ser. No. 64,335
8 Claims. (Cl. 99—109)

This invention relates to sausage preparation and dyeing. More particularly the invention relates to a process and means for forming a sausage through the use of molds and without the use of natural or artificial casings and thereafter subjecting the formed sausage to the action of hot air or a gaseous medium for forming a skin thereon, and dyeing the sausage product. The invention is particularly useful in the treating and dyeing of sausages formed in unit masses in molds from a comminuted meat mixture, the meat mixture being subjected to rapid internal heating by means of passing an electric current therethrough.

The problem of treating or dyeing a sausage encased in a natural or artificial casing is relatively simple because of the presence of the casing and its adaptability to receive the dye and to protect the enclosed meat mixture. However, when skinless sausages, as, for example, skinless frankfurters, are formed through the use of molds and cooking means for coagulating protein and making the sausage self-supporting, there is no protective surface about the sausage and the problem of dyeing, skin forming and other treatment of the formed sausage presents difficulties. For example, when a sausage unit, such as a frankfurter, is formed within a mold by rapid internal heating by passing an alternating electric current therethrough, a rendering effect is produced and there are coagulated products, such as fat, protein, and water, on the sausage body, and such conditions make it difficult to provide the frankfurter or sausage with the desired skin surface characteristics when, with colored products, the coloring matter or dye penetration is such as to meet or be satisfactory according to Government regulations as they exist today.

An object of the present invention is to provide a process and means for overcoming the above-mentioned difficulties and for obtaining uniform surface treatment in the skin-forming and smoking operation and in the dyeing of the sausage. Other specific objects and advantages will appear as the specification proceeds.

The meat mixture employed in connection with the method of this invention may be prepared in any suitable manner to provide the desired composition for the frankfurter or other sausage product. We prefer to employ the method described in our copending application, Serial No. 846,795, filed October 16, 1959. The method of that application involves placing a suitable meat mixture into a standard meat comminuter. Ice and the necessary salts and cure may then be added and the comminuted sausage mixture subjected to further mixing and blending. The chilling operation follows, after which, in the preferred practice, the chilled comminuted mixture is mechanically mixed under vacuum, compacted to remove voids, and the mixture, substantially free of air and voids, is extruded into a mold. Under some conditions, the chilling step may be omitted.

This conditioning procedure is particularly suitable for rapid internal heating wherein an electrical current is passed through the sausage mixture to coagulate proteins and to cook the meat.

In the preferred practice of this invention, the mold is employed in connection with apparatus which is capable of rapid internal cooking of the sausage mixture. Rapid internal cooking may be accomplished by holding the comminuted sausage mixture in the mold and bringing electrodes into contact with each end of the mixture, thus making the mixture part of an electric circuit. An alternating electric current may then be passed through the mixture which represents a moderate electrical resistance in the circuit. The flow of current through this resistance results in the generation of internal heat sufficient to cook the unit mass of mixture. It is desirable that the electrical cooking means employed be associated with an integrator, the function of which is to assure that a fixed amount of electrical energy will be passed through each unit mass of mixture regardless of any variation in the electrical resistivity of the mixture.

The cooking time generally is about one-third of a second, but this interval may vary, for example, up to one second, depending on the temperature of the mixture at the time of current flow, the size of the unit mass of sausage mixture, the salt content thereof, and the amount of electrical energy passed through the unit mass. Under some conditions, it is found that the cooking time may be as long as one second, or greater.

We have found that an electrically generated temperature of from about 150° F. to about 212° F. and preferably from about 155° F. to about 180° F., produces a final product not only having the desired surface properties but also a texture and color comparable to high quality sausages produced by the slower conventional methods.

In accordance with the teachings of this invention, the term "sausage" is intended to mean all products comprising ground meat, such as beef, ham, veal, bologna, luncheon loaf, and other well-known cooked sausage products.

Apparatus which may be employed in the practice of our invention is shown in the accompanying drawings, in which—

FIG. 1 is a diagrammatic showing, partly in section, of the apparatus; FIG. 2, a broken top plan view, of an enlarged scale, of conveyor mechanism for advancing and rolling the sausages; FIG. 3, a broken side view in elevation, on an enlarged scale, of the conveyor apparatus; FIG. 4, a transverse sectional view; FIG. 5, an enlarged broken detail sectional view, the section being taken as indicated at line 5—5 of FIG. 3; FIG. 6, an enlarged sectional detail view, the section being taken as indicated at line 6—6 of FIG. 2, and FIG. 7, a transverse sectional view showing a modified form of pusher bar.

In the schematic view shown in FIG. 1, 10 designates a container receiving the comminuted meat or emulsion from the emulsifier. From this source, the emulsion is passed to a vacuumizing unit 11 and from thence to a holding cooler 12. Chilling of the comminuted meat or emulsion prior to its storage within the holder 12 may occur either before or after the vacuumizing step. For example, if the emulsion is quickly chilled, as by the use of liquid $CO_2$ or Dry Ice, the vacuumizing step may take place after chilling and prior to holding in the cooler-unit 12. On the other hand, if the emulsion is cooled in a heat exchange system, as by a votator, the emulsion may be vacuumized first and then chilled by the heat exchange system.

From the holder 12, the emulsion is passed to a closed system vacuum stuffer 13 in which the emulsion is subjected to vacuum in a closed system and under sufficient pressure to close the voids within the emulsion, and the emulsion then passed through the closed pipe 14 to the forming or cooking unit 15. The meat mixture or emulsion is stuffed into a mold within the unit 15. As the unit rotates one station, the sausage is subjected to an alternating electric current passing therethrough to coagulate the proteins of the mixture, and the formed sausage, indicated by the numeral 16, is ejected upon a transfer conveyor 20 as the unit rotates to the end of its cycle. For the purpose of illustration, the cylindrical sausages 16 are shown on a greatly enlarged scale in proportion to the apparatus.

The cooked sausage is subjected to a water wash or shower at 18 for removing coagulation products (protein, fat, and water), and the washed sausages are passed into a post-forming unit indicated by the numeral 19. A conveyor is mounted in the unit 19 and is indicated generally by the numeral 20. The post-forming unit has a plurality of compartments or stations. The first station, which is indicated by the numeral 21, is for the application of hot air and smoke for the skin forming and smoking of the sausage; the next station, indicated by the numeral 22, is for the application of dye or hot wash water; the third station, which is indicated by the numeral 23, is for drying the sausage; and the fourth station, indicated by the numeral 24, is a chilling section. From the chilling section, the sausages are delivered upon transfer conveyors 25 and 26 leading to packaging unit 27. Hot air and smoke may be introduced into compartment 21 through the conduit 21a and withdrawn through conduit 21b. Dye or hot water may be showered upon the sausages through the head 22a and the dye collected in a container 22b for return by pump (not shown) to the head 22a. Any suitable means for the introduction of the smoking, dyeing, drying, and chilling mediums may be employed.

The conveyor 20 comprises an upper plate 28 on which the sausages are rolled, and a lower plate 29 on which the sausages are also rolled. A roller chain conveyor 30 extends around sprocket wheels 31 and 32, one of which is driven, and the roller chain carries transverse flights or pusher bars 33 which preferably have forwardly-pressed ribs 34 for engaging the cylindrical sausage 16 at spaced distances. The bars also have end flanges 35 which keep the sausages in alignment. As best shown in FIG. 3, a removable curved plate 29a is provided for guiding the sausages from the upper plate 28 downwardly onto the lower plate 29.

A modified form of pusher bar is shown in FIG. 7. In this structure, the bar is formed of wire having a U-shaped wire portion 36 with depending fingers 37.

In the dyeing operation in section 22 a hot aqueous dye is discharged through a sprinkler or shower head 22a onto the cylindrical sausages 16, and the overflowing dye is collected below in the container 22b. If desired, the plate 28 may be perforated in the area below the head 22a so as to permit the dye to pass into the container therebelow or, if desired, the plate 28 may be imperforate so that the dye overflows along the sides of the plate into the container 22b therebelow. The dye may be re-circulated by any suitable means to the head 22a and, if desired, the re-circulated liquid may be skimmed, filtered and reheated. We prefer to employ a relatively high temperature in the neighborhood of 160° F.

For certain uses, it is desirable not to dye the sausage product at all and, in such cases, we prefer to substitute for the dye a hot waater wash in which the water is maintained at about a temperature of 160° F. The hot water is effective in removing surface fat, etc. formed in chamber 21 where the sausage is subjected to hot air blasts.

We find that excellent results are obtained by the use of the two washing stations 18 and 22. At station 22, the wash water is preferably maintained at a lower temperature of about 90° F. to 100° F. While as stated at station 22 the wash water is maintained at about 160° F. where the sausage is dyed through the use of an aqueous dye, it is found that the dye serves not only its purpose as a dye but also the function of the wash water in removing surface films formed in the previous station 21.

We have discovered that surface dyeing meeting government specifications can be accomplished in a minimum of time by forming the sausage in cylindrical form and rolling it over a plate while spraying or showering dye upon the sausage and the plate. We prefer to employ an aqueous dye having an excess of vinegar above that ordinarily employed with such dye. For example, we use 3.5 to 6 pints of vinegar per 100 gallons of water, or 16.5 ml./gal. to 28.4 ml./gal. As the frankfurter rolls along the plate, the dye is impacted onto the surface of the rolling frankfurter to form a thin uniform dye surface sheath thereon.

Specific examples of the dyeing operation may be set out as follows:

Example I

Frankfurters formed in the unit apparatus 15 as shown in FIG. 1 of the drawing were discharged onto the conveyor 20 and sprayed with water at station 18, the water being heated to 100° F. The frankfurters were picked up individually by the conveyor 20 and carried in a separated relation through the skin-forming chamber 21, where they were subjected to hot air and smoke, the hot air blasts forming a thin skin on the frankfurters. 2½ gallons of an aqueous mixture of Imperial dye and New Cherry Red dye containing vinegar in the proportion substantially of 28.4 ml./gal., were discharged through shower head 22a and recirculated through collector container 22b, the recirculated liquid being skimmed, filtered and reheated to maintain the temperature at about 160° F. Each rolling frankfurter passed through the dyeing station in approximately 2½ minutes. The dye formed a uniform surface coating on each frankfurter.

Example II

The process was carried out as described in Example I, except that hot water having a temperature of 160° F. was substituted for the dye solution. The hot water wash removed surface film material formed in the skin-forming operation at station 21 so that the cleaned frankfurter was effectively and uniformly dried in the succeeding chamber 23, as shown in FIG. 1 of the drawing.

The foregoing detailed description has been given for purposes of explanation only, and it is expected that changes may be made in the details of procedure without departing from the spirit of this invention.

We claim:

1. In a process for preparing sausage by encasing comminuted meat in a mold and passing an electric current through the meat to coagulate protein therein, the steps of washing the sausage, subjecting the washed sausage to a hot air blast to form a skin thereon, and showering aqueous dye upon the sausage.

2. The process of claim 1, in which the sausage is formed in cylindrical shape and is rolled during the dye showering step.

3. The process for preparing sausage by encasing comminuted meat in a mold and passing an electric current through the meat to coagulate protein therein, the steps of washing the sausage, subjecting the washed sausage to a hot air blast to form a skin thereon, and again washing the sausage.

4. The process of claim 3 in which aqueous dye constitutes said second-mentioned washing liquid.

5. In a process for treating sausages in which meat is formed in a mold and an electric current is passed therethrough to coagulate the protein, the steps of impinging a hot air blast upon the sausage to form a skin thereon, and showering aqueous dye upon the sausage.

6. The process of claim 5 in which the aqueous dye contains vinegar in the proportion of 16.5 ml./gal. to 28.4 ml./gal.

7. In a process for preparing sausage by encasing comminuted meat in a mold and passing an electric current through the meat to coagulate protein therein, the steps of molding the meat in cylindrical form, washing the formed cylindrical sausage, directing upon the sausage a heated gaseous medium to form a skin on the sausage, and again washing the sausage while rolling the same.

8. The process of claim 7 in which the second washing is with aqueous dye.

References Cited in the file of this patent
UNITED STATES PATENTS

| | | |
|---|---|---|
| 2,043,132 | Vogt | June 2, 1936 |
| 2,060,992 | Jackson | Nov. 17, 1936 |
| 2,685,518 | Prohaska | Aug. 3, 1954 |
| 2,788,735 | Farace | Apr. 16, 1957 |
| 2,995,449 | Allen et al. | Aug. 8, 1961 |